United States Patent
Palm et al.

(10) Patent No.: US 7,337,800 B2
(45) Date of Patent: Mar. 4, 2008

(54) AUTOMATIC FLUSHING SYSTEM AND METHOD FOR A POTABLE WATER STATION

(75) Inventors: Joseph M. Palm, Lombard, IL (US); Loren H. Semler, Franklin Park, IL (US)

(73) Assignee: Semler Industries, Inc., Franklin Park, IL (US)

( * ) Notice: Subject to any disclaimer, the term of this patent is extended or adjusted under 35 U.S.C. 154(b) by 419 days.

(21) Appl. No.: 10/988,752

(22) Filed: Nov. 15, 2004

(65) Prior Publication Data
US 2005/0103693 A1 May 19, 2005

Related U.S. Application Data

(60) Provisional application No. 60/520,468, filed on Nov. 14, 2003.

(51) Int. Cl.
*F16K 17/38* (2006.01)

(52) U.S. Cl. ............... 137/80; 137/238; 137/357; 137/552; 137/624.16

(58) Field of Classification Search ........... 137/79, 137/237–238, 355.16, 357, 80, 557, 624.15, 137/624.16, 552; 285/93; 134/167 R, 104.2, 134/172
See application file for complete search history.

(56) References Cited

U.S. PATENT DOCUMENTS

| | | | | |
|---|---|---|---|---|
| 3,943,727 A | * | 3/1976 | Wade | 62/395 |
| 4,491,150 A | * | 1/1985 | Holman et al. | 137/565.17 |
| 4,938,241 A | * | 7/1990 | Teel | 134/104.2 |
| 5,025,132 A | * | 6/1991 | Fortmann et al. | 219/401 |
| 5,061,372 A | * | 10/1991 | Rak | 210/673 |
| 5,678,596 A | * | 10/1997 | Corallo | 137/357 |
| 5,993,739 A | * | 11/1999 | Lyon | 422/31 |
| 6,206,042 B1 | * | 3/2001 | Channell et al. | 137/624.2 |

* cited by examiner

*Primary Examiner*—Gregory Huson
*Assistant Examiner*—Craig Schneider
(74) *Attorney, Agent, or Firm*—Marshall, Gerstein & Borun LLP

(57) ABSTRACT

An automatic flushing system for a potable water station includes a conduit having a first end connected to a potable water supply source and a second end having a nozzle coupling. It also includes an air gap assembly having a coupling operable for coupling with the nozzle coupling to releasably connect the conduit to the air gap assembly in a stored position. Further, the system includes a control system operable for automatically flushing potable water through the conduit and the air gap assembly after exceeding a predetermined time in which a predetermined minimum threshold temperature is exceeded and a predetermined time during which the potable water station has remained idle. A method for automatically flushing a potable water station includes the step of providing the potable water station with a conduit having a first end connected to a potable water supply source and having a second end remote therefrom. It also includes the steps of coupling the second end of the conduit to an air gap assembly in a stored position of the potable water station, and automatically flushing potable water through the conduit and the air gap assembly of the potable water station. The method performs the step of automatically flushing after: a) a predetermined minimum threshold temperature has been exceeded for a predetermined time, and b) the potable water station has remained idle for a predetermined time.

28 Claims, 1 Drawing Sheet

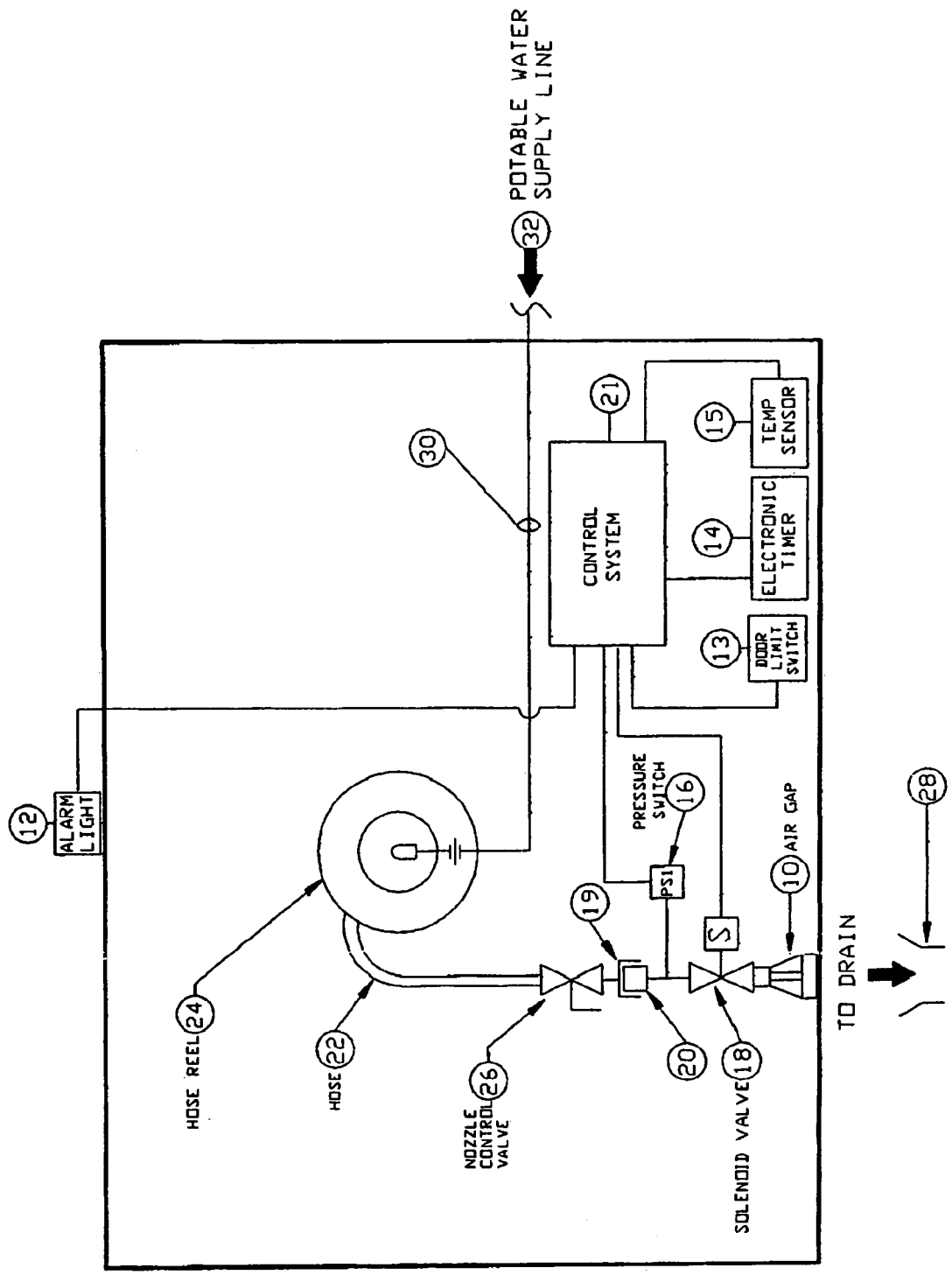

AUTOMATIC FLUSHING SYSTEM AND METHOD FOR A POTABLE WATER STATION

RELATED APPLICATION DATA

This application claims priority to now abandoned U.S. provisional application Ser. No. 60/520,468 filed Nov. 14, 2003.

FIELD OF THE INVENTION

The present invention is generally directed to ensuring against contaminants in potable drinking water and, more particularly, to a system and method for automatically flushing a potable water station with water from a potable water supply source.

BACKGROUND OF THE INVENTION

Potable (drinking) water is commonly found in large commercial transport vehicles such as aircraft, railroad passenger cars, buses, boats and ships. Such water is placed on board these transport vehicles for use as drinking water, making ice cubes, culinary, cleaning, and other sanitary purposes. Care must be taken to assure that harmful bacteria and organisms are not present and/or multiplying in the water found inside the potable water storage and distribution systems in these conveyances. Some organisms can live and multiply very rapidly under certain conditions. Most frequently cited to be of concern are coliform, *ecoli*, and *legionella*, but other common bacteria in domestic water supplies in the United States, Canada, and other countries include, but are not limited to, *salmonella typhia, shingella sonnei, dysenteria, flexneri, boydii, vibro cholerae, campylobacter jejuni, yersinia enterocolitica, plesiomonas shigellojodes*, and *aeromonas hydrophila*. Therefore, care is needed in the treatment and handling of water intended for such uses.

Within the United States, the Environmental Protection Agency has a responsibility for regulatory enforcement of the Safe Water Drinking Act of 1974. The Act covers, among other things, municipal drinking water supplies and other water supplies being used by the public. Other politically stable and economically developed countries have similar agencies with similar responsibilities. It is recognized by these agencies that it is economically impossible to provide absolutely pure water. There are, however, achievable, appropriate, and economical limits to the concentration of chemical, mineral, and organic contaminants. These contaminant concentrations are very low and generally do not represent a health threat to the general population.

Most of the watering points used to transfer water into the transport are filled using municipal, and otherwise regulated, treated water supplies. Acceptably low concentrations of some offensive organisms are routinely introduced into watering points and consequently could find their way into the transport's potable water storage tank(s). Given the right conditions, these offensive organisms can grow and multiply and develop higher concentrations that can be harmful to otherwise strong and healthy people. These organisms can also form biofilms within watering points and a transport's potable water storage tank(s). Such biofilms can re-contaminate watering points and the transport's potable water storage tank(s) even after they have been emptied, flushed, and refilled.

One method for filling a storage tank(s) in a transport's potable water system is the utilization of a potable water station which may take the form of a potable water cabinet (PWC). The PWC is essentially a cabinet containing piping, hose, hose reels, and other apparatuses compatible with drinking water that are used to convey water from the municipal water supply into the transport's potable water storage tank(s).

There are (2) conditions that foster the rapid growth (higher concentrations) of organisms and biofilms in the water within these PWC's. These are temperature and stagnation.

Temperature: Studies have shown that, generally, the optimum temperature under which various harmful bacteria and organisms multiply is 98.6 degrees Fahrenheit. However, bacteria can proliferate at temperatures between 59 degrees Fahrenheit and 149 degrees Fahrenheit. Bacteria will generally die at temperatures above 149 degrees Fahrenheit.

Stagnation: Water that is not flowing provides a quiet environment where bacteria can grow and form biofilms. While good operating practices require the regular flushing of potable water cabinets to mitigate the growth of bacteria in otherwise stagnant water, there is no assurance that operators always flush PWC's in a proper and consistent fashion.

SUMMARY OF THE INVENTION

The automatic flushing system and method for a potable station which is disclosed herein provides an automatic means of flushing a potable water station or cabinet when temperatures within the cabinet approach or are within the growth range of the offending organisms for a predetermined time, i.e., between approximately 59 degrees Fahrenheit and 149 degrees Fahrenheit, and/or when the potable water station has remained idle from lack of activity for a predetermined time allowing the water to stagnate, thus creating an environment conducive to the growth of the offensive organisms and the formation of biofilms.

The automatic flushing system of the present invention includes a conduit having a first end connected to a potable water supply source, such as a municipal, and otherwise regulated, treated public water supply, and it also includes a second end having a nozzle coupling. The system also includes an air gap assembly having a coupling operable for coupling with the nozzle coupling to releasably connect the conduit to the air gap assembly in a stored position. Further, the system includes a control system operable for automatically flushing potable water through the conduit and the air gap assembly after at least one of a predetermined minimum threshold temperature being exceeded for a predetermined time or the potable water station having remained idle for a predetermined time.

The automatic flushing method of the present invention includes the steps of providing the potable water station with a conduit having a first end connected to a potable water supply source and having a second end remote therefrom. The method also includes the steps of coupling the second end of the conduit to an air gap assembly in a stored position of the potable water station, and automatically flushing potable water through the conduit and the air gap assembly of the potable water station. The method performs the step of automatically flushing after a predetermined minimum threshold temperature has been exceeded for a predetermined time and the potable water station has remained idle for a predetermined time.

BRIEF DESCRIPTION OF THE DRAWING

The accompanying drawing FIGURE illustrates an automatic flushing system for a potable water cabinet in accordance with the present invention.

DETAILED DESCRIPTION OF THE PREFERRED EMBODIMENT

With reference to the accompanying drawing FIGURE, the automatic flushing system disclosed herein adds and incorporates the following devices into the PWC: an air gap assembly 10, an alarm light 12, a door limit switch 13, an electronic timer 14, a temperature sensor 15, a pressure switch 16, a solenoid valve 18, a nozzle coupling 19, an air gap assembly coupling 20, a control system 21, a hose or conduit 22, a hose reel 24, a nozzle control valve 26, a drain 28, a conduit or piping 30, and a public water supply 32.

The automatic flushing system for the potable water station or PWC is such that the conduit or piping 30 has a first end connected to a potable water supply source such as a municipal, and otherwise regulated, treated public water supply 32, and it has a second end having the nozzle coupling 19 thereon. It also includes the air gap assembly 10 having the air gap assembly coupling 20 operable for coupling with the nozzle coupling 19 to releasably connect the conduit or hose 22 to the air gap assembly 10 in a stored position. Further, the automatic flushing system includes the control system 21 operable for automatically flushing potable water through the conduits or hoses 22 and 30 and through the air gap assembly 10 after a predetermined minimum threshold temperature is exceeded for a predetermined time and the potable water station has remained idle for a predetermined time.

The automatic flushing system also includes a sensor such as the pressure switch 16 for triggering an alarm such as the alarm light 12 if the nozzle coupling 19 is incorrectly coupled to the air gap assembly coupling 20 or the control nozzle 26 has not been opened. The sensor 16 is operably coupled to the control system 21, and the alarm may either take the form of the alarm light 12 or it may take any other form including one producing an audible signal. The automatic flushing system also includes a temperature sensor 15 for monitoring the temperature inside the potable water station or PWC which is also operably coupled to the control system 21.

In addition, the automatic flushing includes the electronic timer 14 which is also operably connected to the control system 21 to determine when a predetermined temperature threshold has been exceeded for a predetermined time and when the potable water station or PWC has remained idle for a predetermined time.

Still further, the automatic flushing system includes the sensor or limit switch 13 which is also operably connected to the control system 21 for determining whether a door on the potable water station or PWC is in an open or closed position.

From the drawing, it will be seen that at least one valve 18 is operably coupled to the control system which is normally closed. The valve 18 is preferably an electronically controlled solenoid valve in the air gap assembly 10 which is adapted to open so potable water can flow through the conduit and the air gap assembly 10 upon receiving a signal from the control system 21. However, as will be appreciated, the automatic flushing system also preferably includes the nozzle control valve 26 just upstream of the nozzle coupling 19.

With this arrangement, the nozzle control valve 26 is operable to selectively control discharge of potable water through the hose or conduit 22. It can be turned to an off position when it is not desired to discharge potable water and can be turned to an on position for discharging potable water. Also, in joining the couplings 19 and 20, the nozzle control valve 26 will be in an off position but will be turned to an on position after they have been coupled.

As also shown in the drawings, the automatic flushing system includes a hose reel 24 for winding the hose 22 into a stored position (as shown) when the potable water station or PWC is not in use for dispensing water. As also shown, the automatic flushing system is arranged so the air gap assembly 10 can be positioned over the drain 28 so potable water can flow through the air gap assembly 10 and into the drain 28 during automatic flushing.

The operation of the automatic flushing system is as follows: When the potable water station or PWC is not in use, the nozzle coupling 19 at the end of the hose or conduit 22, which is housed on a hose reel 24, is coupled to the air gap assembly coupling 20. This nozzle coupling 19 is normally connected to a transport vehicle when it is being filled with potable water by the potable water station or PWC, but it is in communication with the drain 28 via the air gap assembly 10 when it is properly coupled to the air gap assembly coupling 20. The air gap assembly 10 provides a physical separation between the inlet opening of the drain 28 and the water supply discharge opening in the air gap assembly 10 which faces the drain 28 in the general manner shown schematically in the drawing.

The potable water station or PWC also embodies the limit switch 13, which is activated when the doors (not shown) of the potable water station or PWC are closed, to signal the control system 21 that the potable water station or PWC is idle. The limit switch 13 thereby makes it possible for the control system 21 to sense when the potable water station or PWC is not in use and to signal the electronic timer 14 to determine how long it remains idle. The control system also cooperates with the electronic timer 14 and the temperature sensor 15 which monitors the temperature inside the potable water station or PWC. If the temperature inside the potable water station or PWC is above a pre-determined minimum temperature threshold, for example 59 degrees Fahrenheit, and the electronic timer 14 indicates it remains at this temperature and is idle for a predetermined period of time (typically 4 hours), the control system 21 signals the electronically controlled solenoid valve 18 to open and fresh water is flushed through the wetted surfaces of the potable water station or PWCs such as the hose conduit or piping 30, the conduit or hose 22, the nozzle control valve 26, the nozzle coupling 19, the air gap assembly coupling 20, the electronically controlled solenoid valve 18, and finally through the air gap assembly 10 into the drain 28 for a time determined to be adequate to completely flush the wetted surfaces.

After the automatic flushing for the selected time, the control system 21 signals the electronically controlled solenoid valve 18 to close and the system is reset.

If at any time between automatic flushing cycles the potable water station or PWC is used to fill a transport vehicle's potable water storage tank(s), the opening of the doors for access to the hose or conduit 22 is sensed by the limit switch 13 which signals the control system 21 to reset the electronic timer 14 after use and closing of the doors. This will start a new time cycle for the next automatic flushing cycle. Since the opportunity for the growth of the organisms in question is greatly diminished at temperatures below 59 degrees Fahrenheit, if the temperature inside the cabinet falls below that temperature, the control system 21 ensures automatic flushing will not occur; thus preventing any unnecessary waste of water.

If the temperature has been below the predetermined minimum temperature threshold, for example 59 degrees Fahrenheit, and only intermittently rises above that temperature, the control system 21 causes the electronic timer 14 to start over each time the temperature rises above that temperature unless the temperature stays above the predetermined minimum temperature threshold for the predetermined for automatic flushing.

When a transport filling operation is completed, the hose 22 is stored on its hose reel 24, the nozzle coupling 19 is coupled to the air gap assembly coupling 20 and the nozzle control valve 26 is opened. If the operator fails to couple the nozzle coupling 19 to the air gap assembly coupling 20 correctly in its storage position or fails to open the nozzle control valve 26 (which would prevent proper flushing of the potable water station or PWC through the air gap assembly 10 and drain 28), the pressure switch 16 associated with the air gap assembly 10 will detect the absence of water pressure. If this occurs, an alarm light 12 (and/or an audible signal) will make the operator aware that the couplings 19 and 20 are not correctly coupled or control valve 26 has not been opened even though the doors are closed so automatic flushing cannot occur.

The automatic flushing system eliminates the need to rely on operators to regularly flush the wetted surfaces of a potable water station or PWC and prevents the water inside the potable water station or PWC from remaining stagnant for a duration long enough to enable organisms to grow to harmful concentration levels and/or form biofilms when temperatures inside the cabinet experience, for example 59 degrees Fahrenheit or higher.

In the foregoing, a detailed description of the present invention has been set forth although it will be appreciated by those skilled in the art that the details herein given may be varied without departing from the true spirit and scope of the appended claims.

What is claimed is:

1. A potable water station for use in filling a transport vehicle with potable water and having an automatic flushing system, comprising:
   a conduit having a first end connected to a potable water supply source and a second end having a nozzle coupling for connection to a transport vehicle for filling the transport vehicle with potable water;
   an air gap assembly having a coupling operable for connection to the nozzle coupling on the second end of the conduit to releasably connect the conduit to the air gap assembly in a stored position when the potable water station is not being used to fill a transport vehicle with potable water; and
   a control system operable for automatically flushing potable water through the conduit and the air gap assembly after a predetermined minimum threshold temperature has been exceeded for a predetermined time and the potable water station has remained idle for a predetermined time.

2. The potable water station of claim 1, further comprising:
   a temperature sensor for monitoring the temperature inside the potable water station, the temperature sensor being operably coupled to the control system.

3. The potable water station of claim 1, further comprising:
   a timer for determining the time during which a predetermined temperature threshold has been exceeded, the timer being operably coupled to the control system.

4. The potable water station of claim 1, further comprising:
   a timer for determining the time during which the potable water station has remained idle, the timer being operably coupled to the control system.

5. The potable water station of claim 1, further comprising:
   a limit switch for determining whether a door on the potable water station is in an open or closed position, the limit switch being operably coupled to the control system.

6. The potable water station of claim 1, further comprising:
   at least a portion of the conduit being a hose and including a hose reel for winding the hose into a stored position.

7. The potable water station of claim 1, wherein the air gap assembly is positioned over a drain such that potable water will flow through the air gap assembly and into the drain during automatic flushing.

8. The potable water station of claim 1, further comprising:
   at least one valve operably coupled to the control system, the at least one valve normally being closed but adapted to open so potable water can flow through the conduit and the air gap assembly upon receiving a signal from the control system.

9. The potable water station of claim 8, wherein the at least one valve is an electronically controlled solenoid valve in the air gap assembly.

10. The potable water station of claim 1, further comprising:
    a sensor for triggering an alarm if the nozzle coupling is incorrectly coupled to the air gap assembly coupling or a control nozzle valve associated with the conduit is not opened, the sensor being operably coupled to the control system.

11. The potable water station of claim 10, wherein the alarm triggering sensor is a pressure switch for sensing water pressure in the air gap assembly.

12. The potable water station of claim 10, wherein the alarm includes a visible signal.

13. The potable water station of claim 10, wherein the alarm includes an audible signal.

14. A potable water station for use in filling a transport vehicle with potable water and having an automatic flushing system, comprising:
    a conduit having a first end connected to a potable water supply source and a second end having a nozzle coupling for connection to a transport vehicle for filling the transport vehicle with potable water;
    an air gap assembly having a coupling operable with the nozzle coupling on the second end of the conduit to releasably connect the conduit to the air gap assembly in a stored position when the potable water station is not being used to fill a transport vehicle with potable water; and
    a temperature sensor for monitoring the temperature inside the potable water station;
    a timer for determining the time during which a predetermined minimum threshold temperature has been exceeded and the time during which the potable water station has remained idle; and
    a control system operably coupled to the temperature sensor, the timer and the air gap assembly for automatically flushing potable water through the conduit and air gap assembly after the predetermined minimum threshold temperature has been exceeded for a predetermined period of time and the potable water station has remained idle for a predetermined time.

15. The potable water station of claim 14, further comprising:
a limit switch for determining whether a door on the potable water station is in an open or closed position, the limit switch being operably coupled to the control system.

16. The potable water station of claim 14, further comprising:
at least a portion of the conduit being a hose and including a hose reel for winding the hose into a stored position.

17. The potable water station of claim 14, wherein the air gap assembly is positioned over a drain such that potable water will flow through the air gap assembly and into the drain during automatic flushing.

18. The potable water station of claim 14, further comprising:,
at least one valve operably coupled to the control system, the at least one valve normally being closed but adapted to open so potable water can flow through the conduit and the air gap assembly upon receiving a signal from the control system.

19. The potable water station of claim 18, wherein the at least one valve is an electronically controlled solenoid valve in the air gap assembly.

20. The potable water station of claim 14, further comprising:
a sensor for triggering an alarm if the nozzle coupling is incorrectly coupled to the air gap assembly coupling or a control nozzle valve associated with the conduit is not opened, the sensor being operably coupled to the control system.

21. The potable water station of claim 20, wherein the alarm triggering sensor is a pressure switch for sensing water pressure in the air gap assembly.

22. The potable water station of claim 20, wherein the alarm includes a visible signal.

23. The potable water station of claim 20, wherein the alarm includes an audible signal.

24. A method for automatically flushing a potable water station for use in filling a transport vehicle with potable water, comprising the steps of:

providing the potable water station with a conduit having a first end connected to a potable water supply source and a second end remote therefrom having a nozzle coupling, the nozzle coupling operable to connect the conduit to a transport vehicle for filling the transport vehicle with potable water, the nozzle coupling also operable to connect the conduit to an air gap assembly in a stored position;

coupling the second end of the conduit to the air gap assembly in the stored position of the potable water station; and automatically flushing potable water through the conduit and the air gap assembly of the potable water station after:

a) a predetermined minimum threshold temperature has been exceeded for a predetermined time, and b) the potable water station has remained idle for a predetermined time.

25. The method of claim 24, further comprising the steps of:
sensing for incorrect coupling of the second end of the conduit to the air gap assembly or a control nozzle valve associated with the conduit not being opened and triggering an alarm in the event of incorrect coupling.

26. The method of claim 24, further comprising the step of:
sensing the temperature inside the potable water station for a temperature exceeding the predetermined minimum threshold temperature.

27. The method of claim 24, further comprising the step of:
determining whether a door has been closed to indicate the portable water station has remained idle for the predetermined time.

28. The method of claim 24, further comprising the step of:
placing the air gap assembly over a drain to permit potable water to flow through the air gap assembly into the drain during automatic flushing.

* * * * *